Patented Oct. 4, 1932

1,880,593

UNITED STATES PATENT OFFICE

EDUARD TSCHUNKUR AND ERNST KRACHT, OF COLOGNE-MULHEIM, AND ERNST HERDIECKERHOFF, OF OPLADEN, GERMANY, ASSIGNORS TO GENERAL ANILINE WORKS, INC., OF NEW YORK, N. Y., A CORPORATION OF DELAWARE

AMINOCARBAZOLE-SULPHONIC ACID

No Drawing. Application filed July 15, 1931, Serial No. 551,044, and in Germany July 18, 1930.

The present invention relates to new 2-aminocarbazole-7-sulphonic acid and to a process of preparing same.

In accordance with the present invention 2-aminocarbazole-7-sulphonic acid is obtained by preparing the 2.2'-4'-triamino-diphenyl-4-sulphonic acid from diphenyl and performing the ring closure to the 2-aminocarbazole-7-sulphonic acid, the individual steps hereafter being more fully described.

For rendering the process successful it is essential to employ the starting diphenyl-4-sulphonic acid in as pure a state as possible.

The production of the diphenyl monosulphonic acid by sulphonating diphenyl is described by Latschinow in "Berichte der Deutschen Chemischen Gesellschaft", volume 6, page 194. When the process is carried out according to these directions a mixture of diphenyl-mono- and -disulphonic acids is, however, obtained, which leads to a less satisfactory yield and a more impure product in the manufacture of triaminodiphenylsulphonic acid.

Now we have found that the diphenyl-4-sulphonic acid is obtainable from diphenyl in an almost uniform condition provided that the sulphonation of diphenyl by means of concentrated sulphuric acid is commenced at room temperature and thereafter the temperature is gradually raised to about 65° C. (Latschinow sulphonated diphenyl with concentrated sulphuric acid directly at water bath temperature.)

The diphenyl-4-sulphonic acid obtained according to the new method of working can be directly nitrated by means of mixed acid to form trinitrodiphenyl-4-sulphonic acid in the suspension resulting from the sulphonation with the result that the new process can be carried out in the factory easily and conveniently. After the isolation of the trinitrodiphenyl-4-sulphonic acid the same can be converted in aqueous suspension into triaminodiphenyl-4-sulphonic acid by known reducing agents, such as for example, iron and hydrochloric acid. The resulting product is the 2.2'-4'-triaminodiphenyl-4-sulphonic acid, which serves as intermediate product in the manufacture of 2-aminocarbazole-7-sulphonic acid.

When the 2.2'-4'-triaminodiphenyl-4-sulphonic acid is heated in the presence of aqueous mineral acid or mineral acid salts, say a 5 to 20% aqueous hydrochloric or sulphuric acid, to only about 150–170° C. for several hours, ammonia is split off with the production of hitherto unknown 2-aminocarbazole-7-sulphonic acid.

This reaction can be favorably influenced by the addition of zinc chloride, aluminium chloride, barium chloride or the like. By further heating of the same charge to about 180–200° C. 2-aminocarbazole is produced in a good yield.

From the products thus rendered available a number of other carbazoles, substituted in the 2-position, can readily be produced by further reactions, for example, by replacing according to Sandmeyer the amino-group by hydroxyl, chlorine, cyanogen and the like. Furthermore the 2-aminocarbazole-7-sulphonic acid can be converted into the 2-amino-7-hydroxycarbazole by alkali fusion or into the 2-aminocarbazole by heating in dilute aqueous mineral acid.

The following example will further illustrate the invention, without limiting it thereto:

Example

*2.2' - 4' - triaminodiphenyl - 4 - sulphonic acid.—*

(a) *Sulphonation.*—100 kgs. of diphenyl are mixed while stirring with 300 kgs. of sulphuric acid of 66° Bé. for one hour at room temperature after which the temperature is then slowly raised in the course of 3 hours to about 65° C. while stirring and maintained for another 1–2 hours at about 65° C. The sulphonation of the diphenyl to diphenyl-4-sulphonic acid is then complete.

(b) *Nitration.*—440 kgs. of mixed acid of about 33% of nitric acid and 67% of sulphuric acid are dropped into the sulphonation mass at 50–60° C. (at a lower temperature the mass solidifies), the temperature is then raised to about 85° C. and the mixture is stirred at this temperature for several hours longer. Thereafter the nitration mass is poured into ice-water and rendered nearly neutral to Congo red with alkali. The greater part of the trinitrodiphenyl monosulphonic acid is thereby precipitated. It is filtered with suction and washed with common salt solution. The trinitrodiphenyl monosulphonic acid remaining in the filtrate is salted out with common salt, filtered with suction and washed with common salt solution.

(c) *Reduction*. — The trinitrodiphenyl monosulphonic acid as obtained under (b) is reduced in aqueous suspension in about 5-8 hours at 100° C. by means of 750 kgs. of iron and about 75 litres of 30% acetic acid or hydrochloric acid while well stirring. The magma from the reduction is rendered alkaline with sodium carbonate and filtered from the iron sludge. The filtrate is evaporated to about 1 cbm. and rendered neutral to Congo red with hydrochloric acid. The 2.2'-4'-triaminodiphenyl-4-sulphonic acid separates on cooling; analysis and chemical reactions confirm the constitution of the 2.2'-4'-triamino-diphenyl-4-sulphonic acid.

*2-aminocarbazole-7-sulphonic acid.—*

50 kgs. of pure triaminodiphenyl sulphonic acid are heated with 2500 litres of 3.5% hydrochloric acid or sulphuric acid for about 6 hours to about 160° C. The precipitated product is filtered, then dissolved in dilute caustic soda, filtered and the 2-aminocarbazole-7-sulphonic acid is precipitated with hydrochloric acid, filtered with suction and dried. It is a white powder, insoluble in water, soluble in alkalies and is a valuable intermediate product for the manufacture of dyestuffs.

*2-aminocarbazole.—*

50 kgs. of pure triaminodiphenyl sulphonic acid are heated with 2500 litres of 2% hydrochloric acid or sulphuric acid to about 200° C. for 6 hours. The precipitated product is filtered, the 2-aminocarbazole which remains in the filtrate is salted out and also filtered. By dissolving and precipitating from dilute hydrochloric acid 2-aminocarbazole is obtained in a good yield.

We claim:

1. The process which comprises sulphonating diphenyl by starting the sulphonation at room temperature, raising the same to about 65° C. and keeping at this temperature until the sulphonation is complete, nitrating the diphenyl-4-sulphonic acid formed, reducing the 2.2'-4'-trinitrodiphenyl-4-sulphonic acid to the 2.2'-4'-triaminodiphenyl-4-sulphonic acid and heating the 2.2'-4'-triaminodiphenyl-4-sulphonic acid in a dilute aqueous mineral acid at a temperature between 150 and 170° C.

2. As a new product the 2-aminocarbazole-7-sulphonic acid, being a white substance, insoluble in water, soluble in alkalies and being a valuable intermediate product for the manufacture of dyestuffs.

In testimony whereof, we affix our signatures.

EDUARD TSCHUNKUR.
ERNST KRACHT.
ERNST HERDIECKERHOFF.